(12) United States Patent
Nakada et al.

(10) Patent No.: US 12,098,563 B2
(45) Date of Patent: *Sep. 24, 2024

(54) COMPUTER SYSTEM PROVIDING SERVICE TO MULTIPLE USERS USING SATELLITES IN EARTH ORBIT, AND METHOD AND PROGRAM EXECUTED BY COMPUTER SYSTEM

(71) Applicant: Terra Space inc., Kyotanabe (JP)

(72) Inventors: Junei Nakada, Tokyo (JP); Sadahiro Kitagawa, Kyoto (JP)

(73) Assignee: Terra Space inc., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/357,230

(22) Filed: Jul. 24, 2023

(65) Prior Publication Data

US 2023/0366233 A1 Nov. 16, 2023

Related U.S. Application Data

(63) Continuation of application No. 17/796,970, filed as application No. PCT/JP2021/003723 on Feb. 2, 2021, now Pat. No. 11,746,554.

(30) Foreign Application Priority Data

Feb. 3, 2020 (JP) ................. 2020-016635

(51) Int. Cl.
*E04H 13/00* (2006.01)
*A61G 17/08* (2006.01)
(Continued)

(52) U.S. Cl.
CPC ............. *E04H 13/00* (2013.01); *A61G 17/08* (2013.01); *B64G 1/10* (2013.01); *B64G 1/22* (2013.01); *B64G 3/00* (2013.01); *H04B 7/18513* (2013.01)

(58) Field of Classification Search
CPC .......... E04H 13/00; A61G 17/08; B64G 1/10; B64G 1/22; B64G 3/00; H04B 7/18513
See application file for complete search history.

(56) References Cited

U.S. PATENT DOCUMENTS

| | | | |
|---|---|---|---|
| 6,112,054 A | 8/2000 | Kita | |
| 9,273,943 B1 * | 3/2016 | Poulsen | ................. F42B 10/44 |

(Continued)

FOREIGN PATENT DOCUMENTS

| | | |
|---|---|---|
| JP | 4-341265 | 11/1992 |
| JP | 10-190543 | 7/1998 |

(Continued)

OTHER PUBLICATIONS

International Search Report for related International Application No. PCT/JP2021/003723 mailed Apr. 20, 2021 and its English Translation.

(Continued)

*Primary Examiner* — Hussein Elchanti
(74) *Attorney, Agent, or Firm* — Renner, Otto, Boisselle & Sklar, LLP

(57) ABSTRACT

A computer system of the present invention comprises a processor unit, and is configured to be capable of communicating with a user device operated by a first user and a satellite. The satellite includes a religious object and an information providing means for providing information associated with the religious object. The processor unit is configured to execute at least the following: acquiring location data indicating a location on Earth of the first user; acquiring bearing data indicating a bearing; calculating, on the basis of the location data and the bearing data, a time period in which the satellite is located in a predetermined space extending toward the bearing from the location on Earth of the first user; and providing the user device with information associated with the religious object provided by (Continued)

the information providing means of the satellite only during the time period.

5 Claims, 10 Drawing Sheets

(51) Int. Cl.
*B64G 1/10* (2006.01)
*B64G 1/22* (2006.01)
*B64G 3/00* (2006.01)
*H04B 7/185* (2006.01)

(56) References Cited

U.S. PATENT DOCUMENTS

| | | | |
|---|---|---|---|
| 9,775,004 B2* | 9/2017 | Cawse | G08G 1/0112 |
| 2005/0015203 A1* | 1/2005 | Nishira | B60W 50/16 |
| | | | 340/436 |
| 2005/0192828 A1* | 9/2005 | Knippscheer | G06Q 20/10 |
| | | | 705/39 |
| 2010/0161192 A1* | 6/2010 | Nara | B60W 30/18145 |
| | | | 701/1 |
| 2016/0093212 A1* | 3/2016 | Barfield, Jr. | H04N 7/181 |
| | | | 348/144 |
| 2017/0018189 A1* | 1/2017 | Ishikawa | B60W 30/18163 |
| 2017/0150060 A1* | 5/2017 | Herz | G06Q 30/0643 |
| 2017/0336797 A1* | 11/2017 | Abe | G06V 20/56 |
| 2018/0060153 A1* | 3/2018 | Innes | H04L 41/06 |
| 2018/0162501 A1* | 6/2018 | Peterson | G01N 33/18 |
| 2018/0354510 A1* | 12/2018 | Miyata | B60W 30/18163 |
| 2018/0354518 A1* | 12/2018 | Inou | G08G 1/163 |
| 2019/0071099 A1* | 3/2019 | Nishiguchi | B62D 15/0255 |
| 2019/0072970 A1* | 3/2019 | Izumori | B60W 30/18145 |
| 2019/0084572 A1* | 3/2019 | Oishi | B60Q 1/40 |
| 2019/0143983 A1* | 5/2019 | Hashimoto | B60W 10/18 |
| | | | 701/23 |
| 2019/0329780 A1* | 10/2019 | Tomescu | B62D 15/029 |
| 2020/0050195 A1* | 2/2020 | Gross | G05D 1/0257 |
| 2020/0148204 A1* | 5/2020 | Kunz | G05D 1/0088 |
| 2020/0398849 A1* | 12/2020 | Kanoh | G08G 1/16 |
| 2021/0398045 A1* | 12/2021 | Hanebeck | G06Q 10/06315 |

FOREIGN PATENT DOCUMENTS

| | | |
|---|---|---|
| JP | 2000-217873 A | 8/2000 |
| JP | 2004-133901 A | 4/2004 |
| JP | 2018-184080 A | 11/2018 |

OTHER PUBLICATIONS

First Office Action for corresponding Japanese Application No. 2020-016635 dated Sep. 1, 2021 and its English Machine Translation.

Decision to Grant a Patent for corresponding Japanese Application No. 2020-016635 dated Nov. 24, 2021 and its English Machine Translation.

* cited by examiner

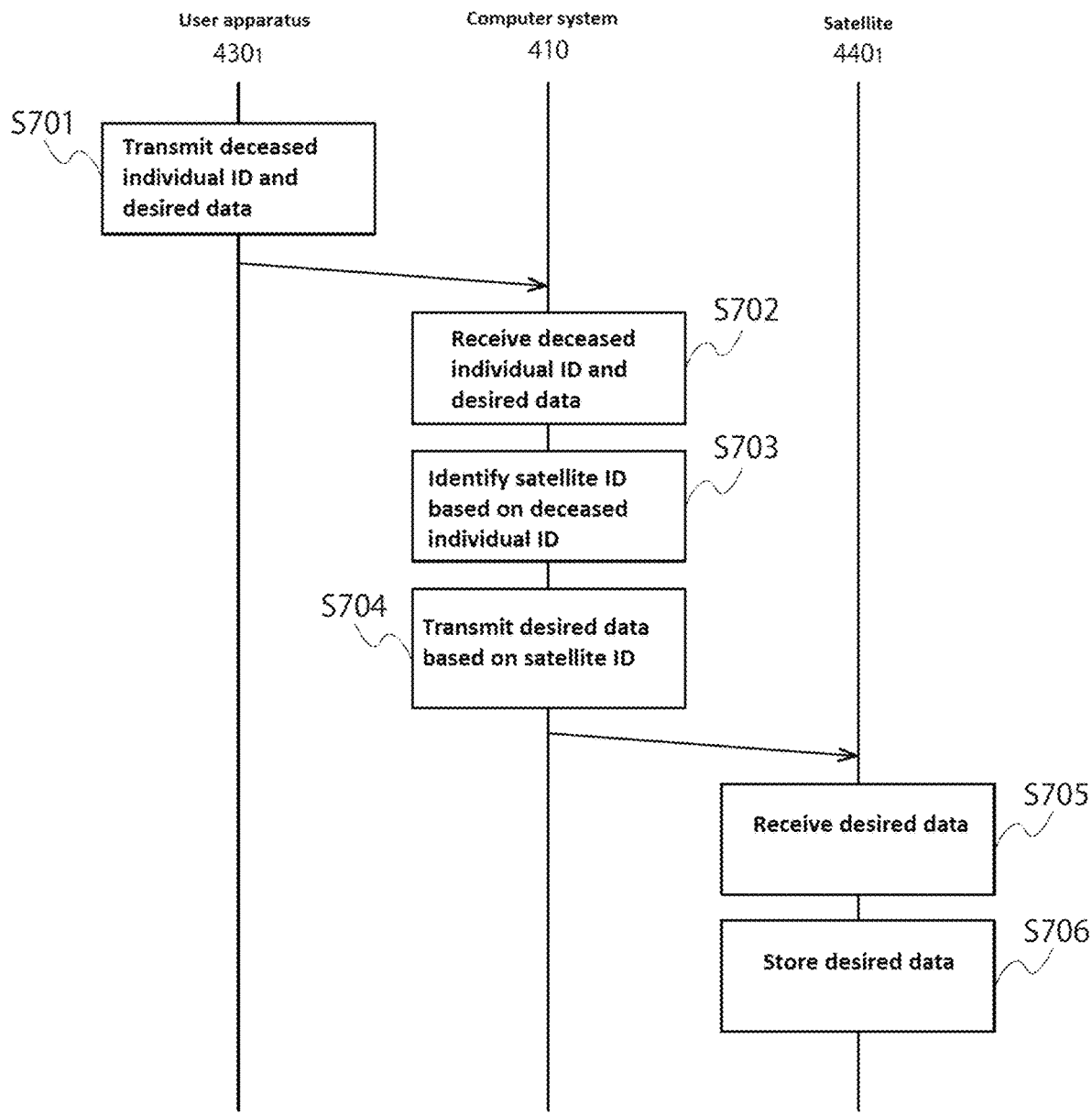

COMPUTER SYSTEM PROVIDING SERVICE TO MULTIPLE USERS USING SATELLITES IN EARTH ORBIT, AND METHOD AND PROGRAM EXECUTED BY COMPUTER SYSTEM

This application is a Continuation and claims priority of U.S. application Ser. No. 17/796,970, filed 2 Aug. 2022, which claims priority of International Application No. PCT/JP2021/003723 filed 2 Feb. 2021, which claims priority to Japan Application No. 2020-016635 filed 3 Feb. 2020, the entireties of which are hereby incorporated by reference.

TECHNICAL FIELD

The present invention relates to a computer system for providing a service to a plurality of users by utilizing a satellite on an orbit around Earth, and a method and a program that are executed in such a computer system.

BACKGROUND ART

With a decrease in the household size in recent years, the unit of one household is about to transition from a unit of "house" to a unit of "individual" (i.e., increase in "individualization"). Further, with the recent changes in the industrial structure, the main industry is about to transition rapidly from primary industries to tertiary industries/quaternary industries (acceleration in transition from the so-called "settled lifestyle" to "nomadic lifestyle"). In light of such changes in the social landscape, the premise of settling down on a land passed down from generation to generation is about to disappear. One of the concerns of modern individuals is that it is difficult to manage the ancestral grave due to the difficulty in settling down on a land passed down from generation to generation.

A technology for placing a columbarium that houses remains from cremation on an orbit around Earth is known as a conventional technology for overcoming such difficulty (see, for example, Patent Literature 1).

CITATION LIST

Patent Literature

[PTL 1] Japanese Laid-Open Publication No. 2000-217873

SUMMARY OF INVENTION

Technical Problem

Although the aforementioned conventional technology would free a modern individual from being tied down to a land passed down from generation to generation in order to tend to a grave, it had a problem in that it is difficult to deem a columbarium in space as a foundation of faith.

The inventors arrived at a concept of a "space temple" in space as a temple where individualized and mobile modern individuals can lean on. Such a "space temple" provides various services, which enable a plurality of users on Earth to use the "space temple" as a foundation of faith, to the plurality of users on Earth.

The present invention was conceived in view of such a problem. The objective of the invention is to provide a computer system that can materialize the concept of a "space temple" and a method and a program that are executed in such a computer system.

Solution to Problem

In one aspect of the present invention, the computer system of the invention is a computer system for providing a service to a plurality of users by utilizing a satellite on an orbit around Earth, wherein the computer system comprises a processing unit, the computer system is configured to enable a user apparatus and the satellite to communicate, the satellite comprises a religious object and information providing means for providing information associated with the religious object, the user apparatus is operated by a first user who is one of the plurality of users, and the processing unit is configured to execute at least: obtaining location data indicating a location of the first user on Earth; obtaining direction data indicating a direction; computing a timeframe during which the satellite is positioned within a predetermined space extending from the location of the first user on Earth toward the direction based on the location data and the direction data; and providing information associated with the religious object provided by the information providing means of the satellite to the user apparatus only during the timeframe.

In one embodiment, the present invention may be configured so that the information providing means comprises a first camera, which is capable of capturing Earth from a viewpoint of the religious object, and the information associated with the religious object is an image of Earth from a viewpoint of the religious object captured by the first camera.

In one embodiment, the present invention may be configured so that the information providing means further comprises a second camera, which is capable of capturing the religious object, and the information associated with the religious object is an image captured by the first camera and an image captured by the second camera.

In one embodiment, the present invention may be configured so that the processing unit is configured to further execute notification of a start time of the timeframe and an end time of the timeframe in advance to the user apparatus.

In one embodiment, the present invention may be configured so that the processing unit is configured to further execute notification of a start of the timeframe at a start time of the timeframe.

In one embodiment, the present invention may be configured so that the processing unit is configured to further execute transmission of desired data of the first user to the satellite.

In one embodiment, the present invention may be configured so that the satellite further comprises one or more housings for storing remains from cremation requested to be buried from each of the plurality of users.

In one embodiment, the present invention may be configured so that the processing unit is configured to further execute: obtaining an identifier for identifying each of the one or more housings and desired data; and transmitting the desired data to a housing identified by the identifier as an offering.

In one embodiment, the present invention may be configured so that the desired data comprises text data, image data, audio data, or a combination thereof.

In one embodiment, the present invention may be configured so that the religious object comprises a statue of Buddha.

In one embodiment, the present invention may be configured so that the direction is a direction designated by the first user, a direction designated by default, a direction designated at random, or a direction designated in the past.

In one aspect of the present invention, the method of the invention is a method executed in a computer system for providing a service to a plurality of users by utilizing a satellite on an orbit around Earth, wherein the computer system comprises a processing unit, the computer system is configured to enable a user apparatus and the satellite to communicate, the satellite comprises a religious object and information providing means for providing information associated with the religious object, the user apparatus is operated by a first user who is one of the plurality of users, and the method comprises: obtaining, by the processing unit, location data indicating a location of the first user on Earth; obtaining, by the processing unit, direction data indicating a direction; computing, by the processing unit, a timeframe during which the satellite is positioned within a predetermined space extending from the location of the first user on Earth toward the direction based on the location data and the direction data; and providing, by the processing unit, information associated with the religious object provided by the information providing means of the satellite to the user apparatus only during the timeframe.

In one aspect of the present invention, the program of the invention is a program executed in a computer system for providing a service to a plurality of users by utilizing a satellite on an orbit around Earth, wherein the computer system comprises a processing unit, the computer system is configured to enable a user apparatus and the satellite to communicate, the satellite comprises a religious object and information providing means for providing information associated with the religious object, the user apparatus is operated by a first user who is one of the plurality of users, and the program, when executed by the processing unit, causes the processing unit to execute at least: obtaining location data indicating a location of the first user on Earth; obtaining direction data indicating a direction; computing a timeframe during which the satellite is positioned within a predetermined space extending from the location of the first user on Earth toward the direction based on the location data and the direction data; and providing information associated with the religious object provided by the information providing means of the satellite to the user apparatus only during the timeframe.

In one aspect of the present invention, the computer system of the invention is a computer system for providing a service to a plurality of users by utilizing a satellite on an orbit around Earth, wherein the satellite is configured to be able to release energy, the computer system comprises a processing unit, the computer system is configured so that communication can be established with the satellite, the processing unit is configured to execute at least: obtaining a desired message of a first user, the first user being one of the plurality of users; obtaining direction data for designating a direction toward which energy is to be released; and transmitting the desired message and the direction data to the satellite, and the desired message and the direction data are used by the satellite for the satellite to release energy in accordance with the desired message toward a direction designated by the direction data.

In one embodiment, the present invention may be configured so that the release of energy in accordance with the desired message comprises releasing energy with varied emission intervals in accordance with the desired message.

In one embodiment, the present invention may be configured so that the processing unit is configured to further execute: computing a first time at which the satellite is enabled to release the energy toward the direction; and transmitting the first time to the satellite, and the desired message and the direction data are used by the satellite upon arrival of the first time.

In one embodiment, the present invention may be configured so that the processing unit is configured to further execute: computing a second time at which communication with the satellite is enabled; and determining whether the second time has arrived, and the transmitting the desired message and the direction data is executed when it is determined that the second time has arrived.

In one embodiment, the present invention may be configured so that the direction data is data indicating a star, data indicating a constellation, or data indicating a nebula.

In one aspect of the present invention, the method of the invention is a method executed in a computer system for providing a service to a plurality of users by utilizing a satellite on an orbit around Earth, wherein the satellite is configured to be able to release energy, the computer system comprises a processing unit, the computer system is configured so that communication can be established with the satellite, the method comprises: obtaining, by the processing unit, a desired message of a first user, the first user being one of the plurality of users; obtaining, by the processing unit, direction data for designating a direction toward which energy is to be released; and transmitting, by the processing unit, the desired message and the direction data to the satellite, and the desired message and the direction data are used by the satellite for the satellite to release energy in accordance with the desired message toward a direction designated by the direction data.

In one aspect of the present invention, the program of the invention is a program executed in a computer system for providing a service to a plurality of users by utilizing a satellite on an orbit around Earth, wherein the satellite is configured to be able to release energy, the computer system comprises a processing unit, the computer system is configured so that communication can be established with the satellite, the program, when executed by the processing unit, causes the processing unit to execute at least: obtaining a desired message of a first user, the first user being one of the plurality of users; obtaining direction data for designating a direction toward which energy is to be released; and transmitting the desired message and the direction data to the satellite, and the desired message and the direction data are used by the satellite for the satellite to release energy in accordance with the desired message toward a direction designated by the direction data.

Advantageous Effects of Invention

The present invention can provide a computer system that enables materialization of a concept of "space temple", and a method and a program that are executed in such a computer system.

BRIEF DESCRIPTION OF DRAWINGS

FIG. 7 is a diagram showing another example of the flow of processing executed in computer system 410, user apparatus 430₁, and satellite 440₁.

DESCRIPTION OF EMBODIMENTS

The embodiments of the invention are described hereinafter with reference to the drawings. Throughout the entire specification, the same reference number is assigned to the same constituent element.

1. New Business Model for Providing a Service to a Plurality of Users by Utilizing a Satellite The Applicant proposes a new business model for providing a service to a plurality of users by utilizing a satellite on an orbit around Earth. Such a business model is intended to enable a religious object (e.g., a statue of Buddha in Buddhism (principle deity), a cult image, which is a subject of idolatry in a religion other than Buddhism (religion that permits idolatry), etc.) to watch over a plurality of users on Earth from outer space by having a satellite comprising the religious object orbit around Earth on an orbit. With such a business model, users can put their hands together and pray toward a religious object placed on a satellite during a timeframe in which the satellite passes through the sky in a specific direction (e.g., direction designated by the user). A user can also receive an image of Earth seen from the viewpoint of a religious object (still image and/or video) or an image capturing the religious object during the timeframe, whereby the user can feel as though they are being watched over by the religious object.

Figure 1:
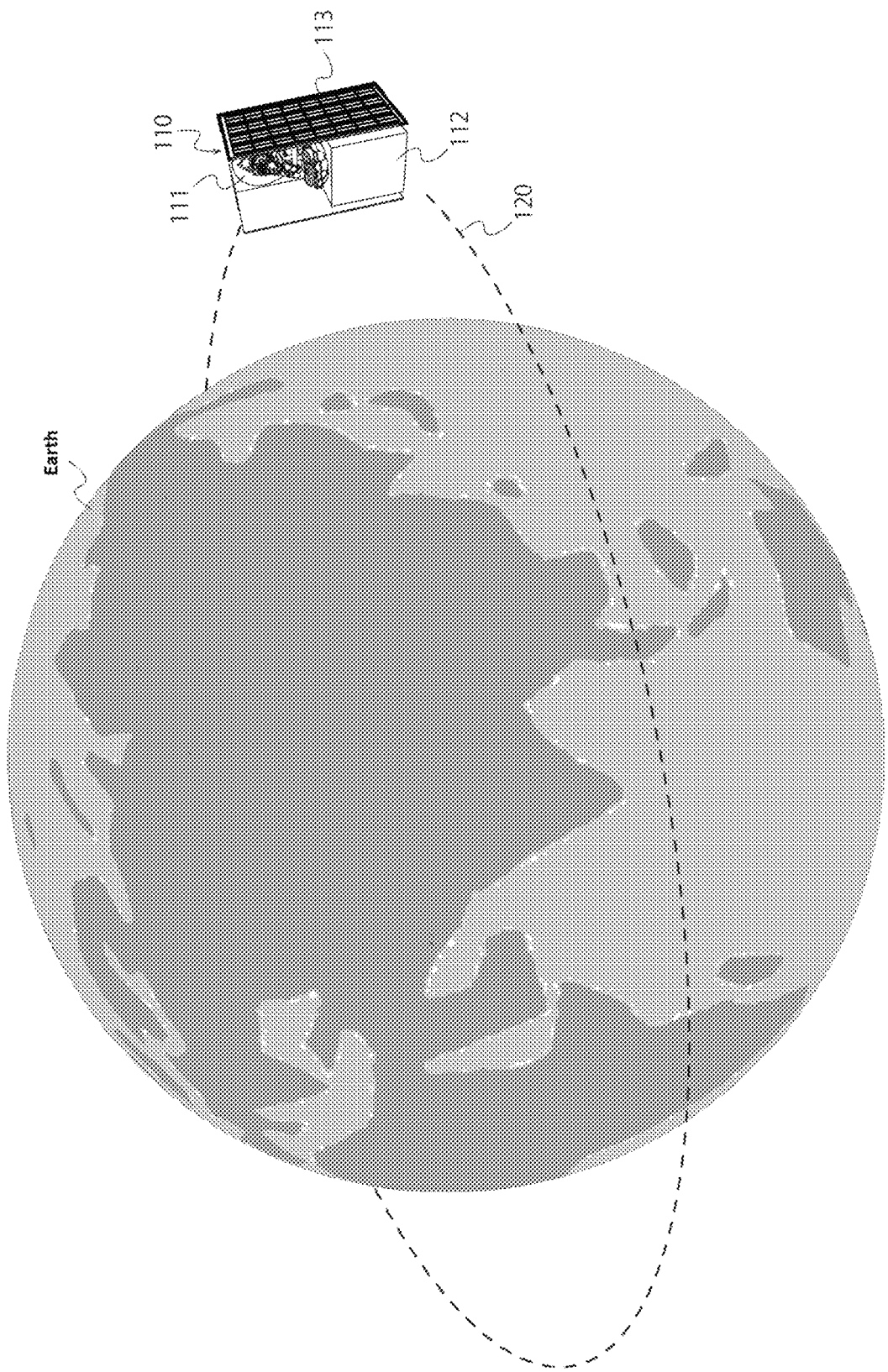
FIG. 1 is a schematic diagram of a new business model for providing a service to a plurality of users by utilizing a satellite.

FIG. 1 is a schematic diagram of a new business model for providing a service to a plurality of users by utilizing a satellite.

In the embodiment shown in FIG. 1, a satellite 110 comprises a statue of Buddha 111, a storage unit 112, and a solar panel 113, and orbits around Earth on an orbit 120. The statue of Buddha 111 is disposed as a subject of religious worship of a plurality of users on Earth. The storage unit 112 is for storing at least an interface unit for communicating with a computer system (e.g., computer system on Earth), a processing unit, a memory unit, and remains from cremation such as bone and/or ash. The solar panel 113 is for at least generating electric energy for driving the interface unit, processing unit, and memory unit of the satellite 110.

The storage unit 112 further comprises one or more housings for storing remains from cremation such as bones and/or ash. Remains from cremation such as bones and/or ash of one deceased individual is stored in each of the one or more housings. Each of the one or more housings may further comprise a memory unit for storing desired data transmitted from a user. Alternatively, remains from cremation such as bones and/or ash of a plurality of deceased individuals may be stored in one housing. Alternatively, remains from cremation such as bones and/or ash of a plurality of deceased individuals may be stored in a void of the statue of Buddha 111 instead of in the storage unit 112.

The orbit 120 is preferably a trajectory with a different timeframe during which a satellite passes through the sky in a specific direction for each predetermined period (e.g., every day, every other day, every three days, every week, every month, etc.), but the present invention is not limited thereto. The orbit 120 may be a trajectory with an invariable timeframe during which a satellite passes through the sky in a specific direction (so-called Sun-synchronous orbit).

The embodiment shown in FIG. 1 describes an example wherein a single satellite 110 orbits around Earth, but the present invention is not limited thereto. The number of satellites orbiting around Earth can be any integer that is one or greater.

2. Screen Displayed on a User Apparatus

Figure 2A:
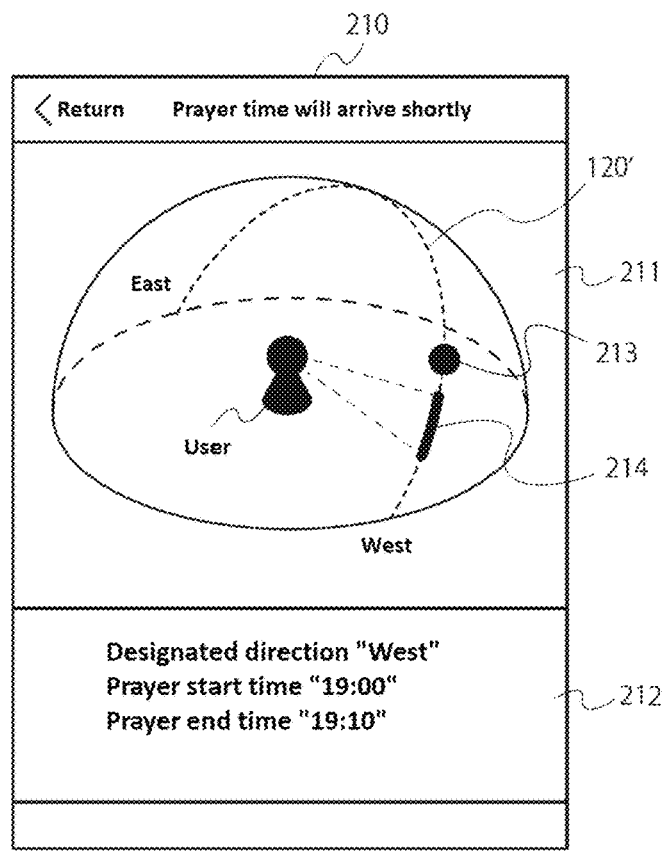
FIG. 2A is a diagram showing an example of screen 210 displayed on a user apparatus.

FIG. 2A shows an example of a screen 210 displayed on a user apparatus. FIG. 2A is an example of a screen for notifying that a timeframe during which a user can pray to the principle deity of the satellite 110 is approaching. For example, if the time period from the current time to the start time of a timeframe during which a user can pray to the principle deity of the satellite 110 is within a predetermined range, a popup display indicating that a timeframe during which the user can pray to the principle deity of the satellite 110 is nearing is automatically displayed on a user apparatus. Selection of a predetermined region within the popup display by the user may start up a predetermined application program to display the screen 210 on the user apparatus. Alternatively, if, for example, the time period from the current time to the start time of a timeframe during which a user can pray to the principle deity of the satellite 110 is within a predetermined range, a predetermined application program may be automatically started up to automatically display the screen 210 on a user apparatus.

In the example shown in FIG. 2A, the screen 210 comprises a position presentation region 211 for presenting the approximate position of the satellite 110 and a timeframe presentation region 212 for presenting a timeframe during which a user can pray to the principle deity of the satellite 110.

On the position presentation region 211 in the example shown in FIG. 2A, a semispherical schematic diagram, in which a user is disposed at the center, is displayed, and a schematic orbit 120' of the satellite 110 is displayed on a semispherical surface. A satellite indicator 213 indicating the approximate position of the satellite 110 and a timing indicator 214 indicating the timing at which a user can pray to the satellite 110 are displayed on the schematic orbit 120'. The satellite indicator 213 moves along the schematic orbit 120' as the satellite 110 orbits around Earth. This allows a user to visually recognize, in real-time, approximately where the satellite 110 is positioned, and about how long until a timeframe, during which the user can pray to the principle deity of the satellite 110, arrives.

On the timeframe presentation region 212 in the example shown in FIG. 2A, the direction designated by a user, start time of a timeframe during which the user can pray to the principle deity of the satellite 110, and end time of a timeframe during which the user can pray to the principle deity of the satellite 110 are displayed. In the example shown in FIG. 2A, the direction designated by the user is "west", the start time of a timeframe during which the user can pray to the principle deity of the satellite 110 is "19:00", and the end time of a timeframe during which the user can pray to the principle deity of the satellite 110 is "19:10".

In the example shown in FIG. 2A, the direction is designated as "west" by the user. Thus, the timing indicator 214 is displayed toward west on the semispherical surface. When the satellite indicator 213 is displayed on the timing indicator 214 in the example shown in FIG. 2A, the user can pray toward the direction "west" where the satellite 110 is positioned, from the start time of "19:00" to the end time of "19:10" of the timeframe during which the user can pray to the principle deity of the satellite 110, whereby the user can offer a prayer to the principle deity of the satellite 110.

The example shown in FIG. 2A describes an example wherein the direction "west" toward which a user prays is designated by the user, but the present invention is not limited thereto. For example, the direction toward which a user prays may be a direction designated by default (e.g., direction predetermined in accordance with the religious sect with which the users associated themselves (or zodiac sign of the year the user was born)), a direction designated at random, or a direction designated in the past.

Figure 2B:
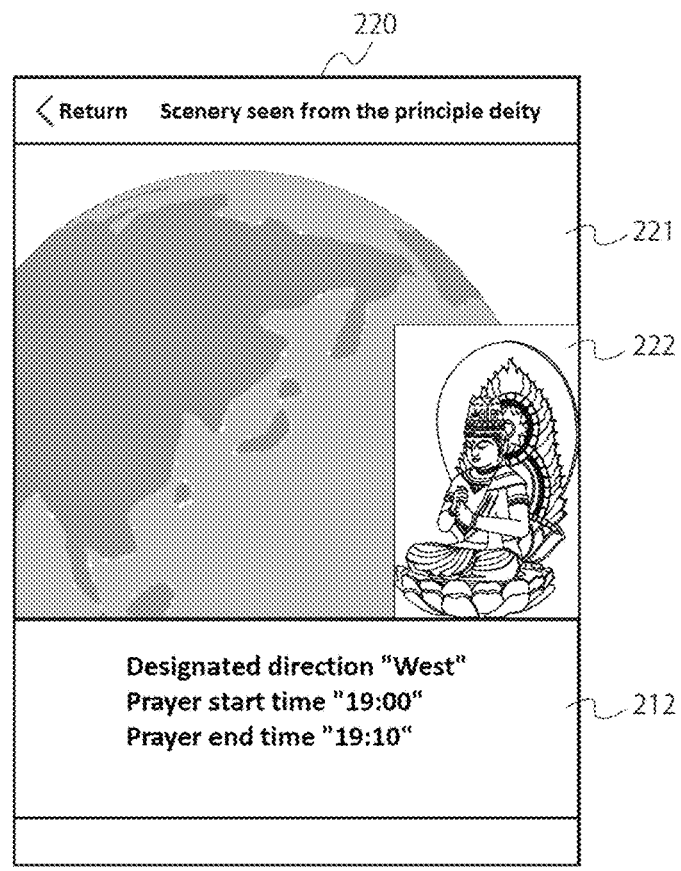
FIG. 2B is a diagram showing an example of screen 220 displayed on a user apparatus.

FIG. 2B shows an example of a screen 220 displayed on a user apparatus. FIG. 2B is an example of a screen for presenting a scenery viewed from the principle deity. The screen 220 is, for example, a screen that is automatically displayed on a user apparatus when the start time of a timeframe during which a user can pray to the principle deity of the satellite 110 has arrived.

In the example shown in FIG. 2B, the screen 220 comprises a first display region 221 for displaying a scenery of Earth seen from the principle deity, a second display region 222 displaying the principle deity, and the timeframe presentation region 212. In this manner, a user can see the scenery of Earth seen from the principle deity and the expression or appearance of the displayed principle deity, whereby the user can feel as though they are being watched over by the principle deity.

In the example shown in FIG. 2B, the scenery of Earth seen from the principle deity is displayed on the first display region 221, and the principle deity is displayed on the second display region 222, but the present invention is not limited thereto. For example, the principle deity may be displayed on the first display region 221, and the scenery of Earth seen from the principle deity may be displayed on the second display region 222. Alternatively, one of the scenery of Earth seen from the principle deity and the principle deity may be displayed on the first display region 221 without displaying the second display region 222 on the screen 220. The example shown in FIG. 2B describes an example wherein the principle deity is displayed to partially overlap with the scenery of Earth seen from the principle deity, but the present invention is not limited thereto. For example, the scenery of Earth seen from the principle deity and the principle deity may be displayed laterally or vertically in parallel so that they do not overlap with each other.

Information associated with the principle deity is displayed on the first display region 221 and the second display region 222. The scenery of Earth seen from the principle deity and the principle deity shown in FIG. 2B are examples of information associated with the principle deity. Information associated with the principle deity displayed on a user apparatus is provided by information providing means installed in the satellite 110 (e.g., first camera capable of capturing the scenery of Earth seen from the principle deity, a second camera capable of capturing the principle deity of the satellite 110, or a camera capable of capturing 360 degrees around for capturing both the scenery of Earth seen from the principle deity and the principle deity (or the principle deity and the background thereof).

3. Another New Business Model for Providing a Service to a Plurality of Users by Utilizing a Satellite The Applicant proposes another new business model for providing a service to a plurality of users by utilizing a satellite on an orbit around Earth. This business model is intended so that a wish of a user placed in a laser can forever continue to fly in outer space by emitting the laser from a satellite orbiting around Earth on an orbit. This business model enables the satellite 110 to emit laser in accordance with a desired message of a user in a direction toward which the laser is to be emitted by obtaining the direction toward which the satellite 110 is to emit laser (e.g., direction toward a constellation or direction toward a star) and the desired message of the user. This enables a wish of a user or a soul of a deceased individual (e.g., name of the deceased individual or Dharma name of the deceased individual) placed on a laser to forever continue to fly in outer space toward, for example, a certain constellation.

Figure 3:
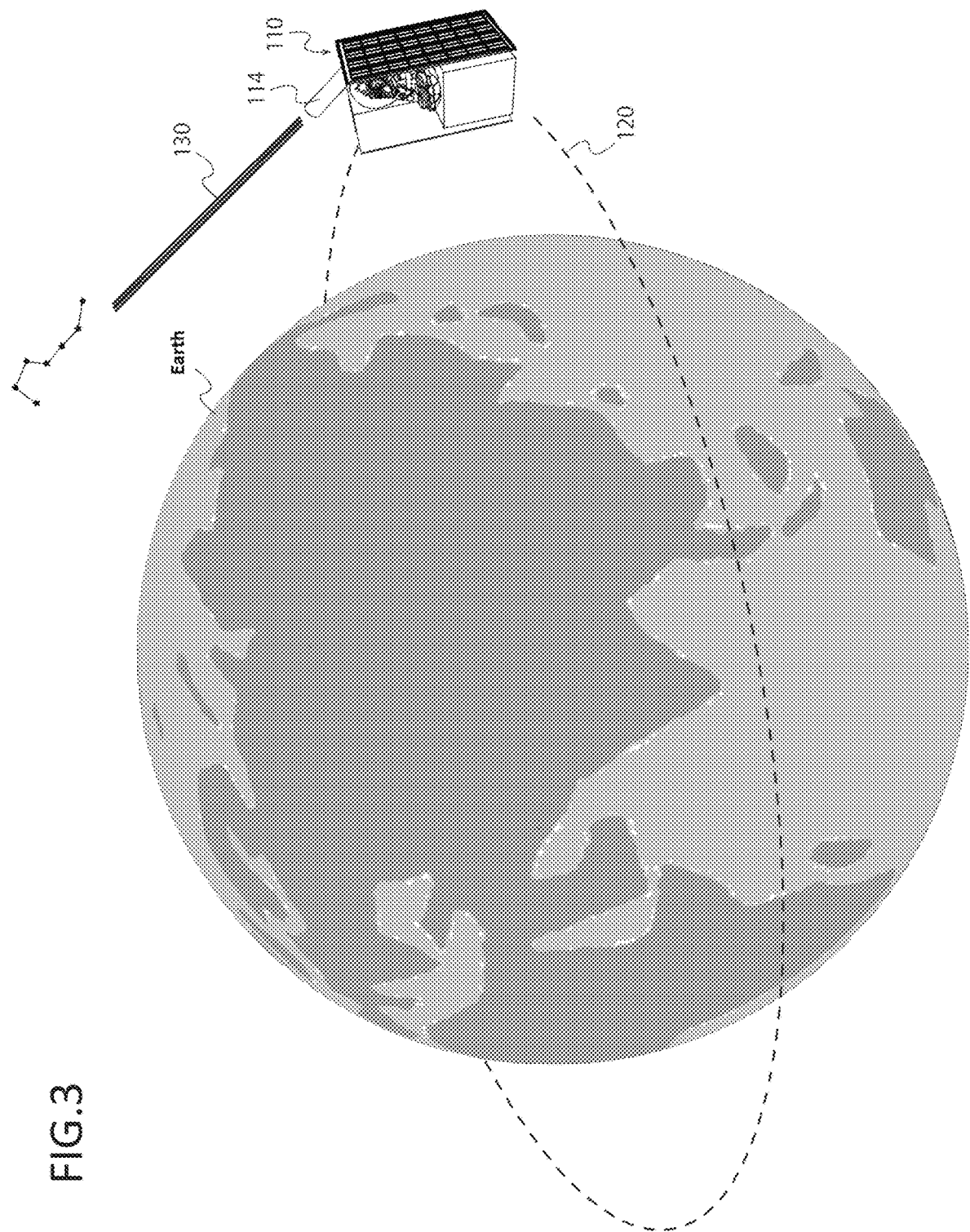
FIG. 3 is a schematic diagram of another new business model for providing a service to a plurality of users by utilizing a satellite.

FIG. 3 is a schematic diagram of another new business model for providing a service to a plurality of users by utilizing a satellite.

In the embodiment shown in FIG. 3, the satellite 110 is orbiting around Earth on the orbit 120, and the satellite 110 further comprises means 114 for emitting a laser 130. In the embodiment shown in FIG. 3, the satellite 110 emits the laser 130 toward the Big Dipper.

In the embodiment shown in FIG. 3, the satellite 110 emits a laser in accordance with a desired message of a user toward the "Big Dipper" in response to receiving the direction indicating the "Big Dipper" and the desired message of the user from a user apparatus (e.g., via a computer system on Earth, or directly). Alternatively, the satellite 110 may obtain the direction indicating the "Big Dipper" from a memory unit of the satellite 110 and emit a laser in accordance with a desired message of a user toward the "Big Dipper" in response to receiving the desired message of the user from a user apparatus (e.g., via a computer system on Earth, or directly). This allows a desired message of a user placed in a laser to forever continue to fly in outer space toward the "Big Dipper".

The means 114 for emitting the laser 130 can have any configuration, as long as a laser can be emitted toward a desired direction in outer space.

4. Configuration of a Computer System for Materializing a New Business Model

Figure 4:
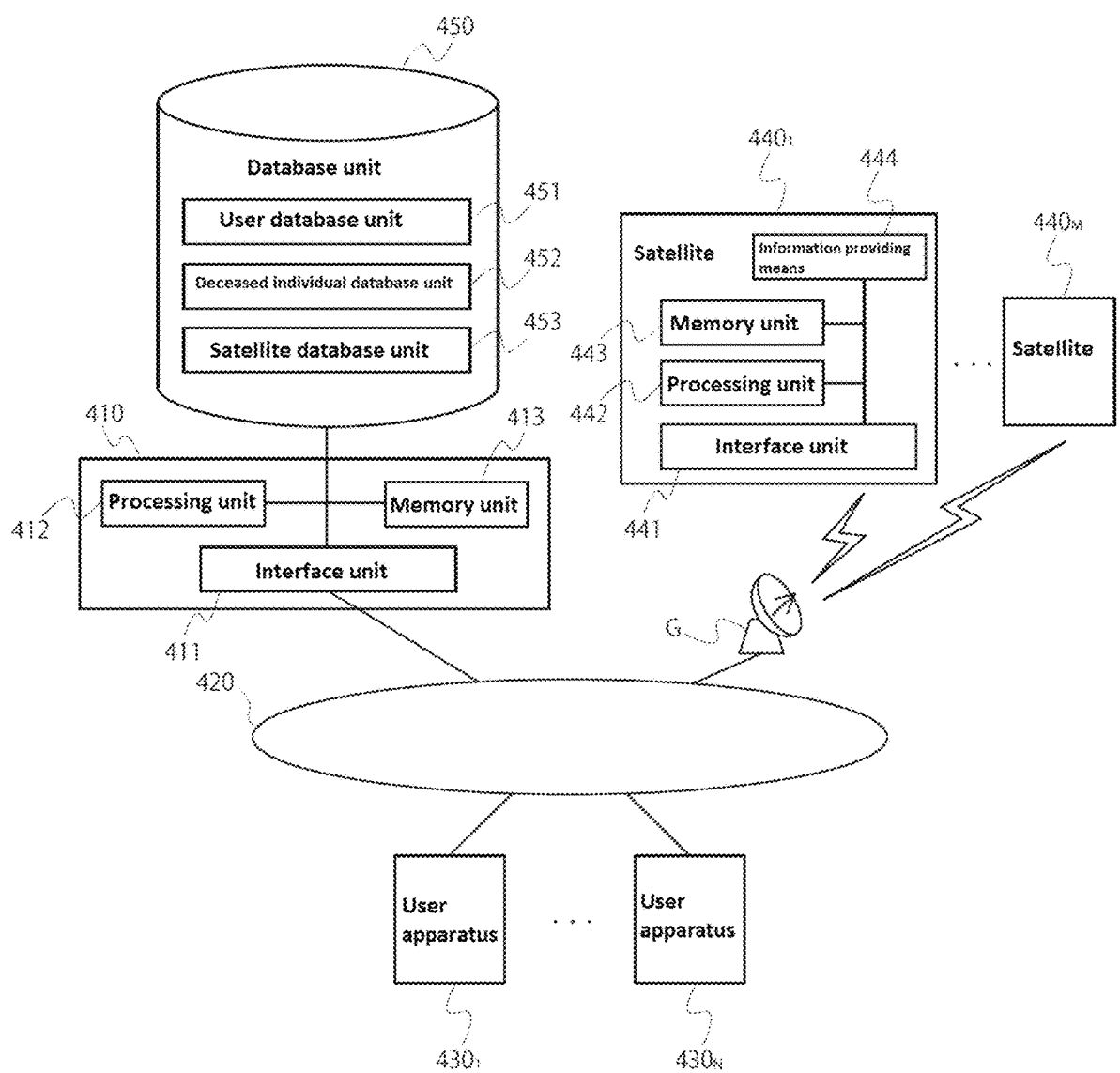
FIG. 4 is a diagram showing an example of the configuration of computer system 410 for materializing a new business model.

FIG. 4 shows an example of the configuration of a computer system 410 for materializing a new business model.

The computer system 410 is configured to be able to connect to at least one user apparatus $430_1$ to $430_N$ used by a user and at least one satellite $440_1$ to $440_M$ orbiting around Earth on an orbit via the Internet 420. In the embodiment shown in FIG. 4, the computer system 410 is configured to be able to communicate with each of at least one satellite $440_1$ to $440_M$ via a ground station G. In this regard, N and M are any integer that is one or greater. The satellite 110 shown in FIG. 1 is one of the at least one satellite $440_1$ to $440_M$.

The computer system 410 is an information processing system managed/operated by a company that manages the at least one satellite $440_1$ to $440_M$ and their respective religious objects. In the embodiment shown in FIG. 4, the computer system 410 comprises an interface unit 411, a processing unit 412 comprising one or more CPUs (Central Processing Units), and a memory unit 413. The hardware configuration of the computer system 410 is not particularly limited, as long as the function thereof can be materialized. The hardware may be comprised of a single machine or a combination of a plurality of machines.

The interface unit 411 controls the communication between each of the at least one user apparatus $430_1$ to $430_N$ and the at least one satellite $440_1$ to $440_M$.

Figure 6:
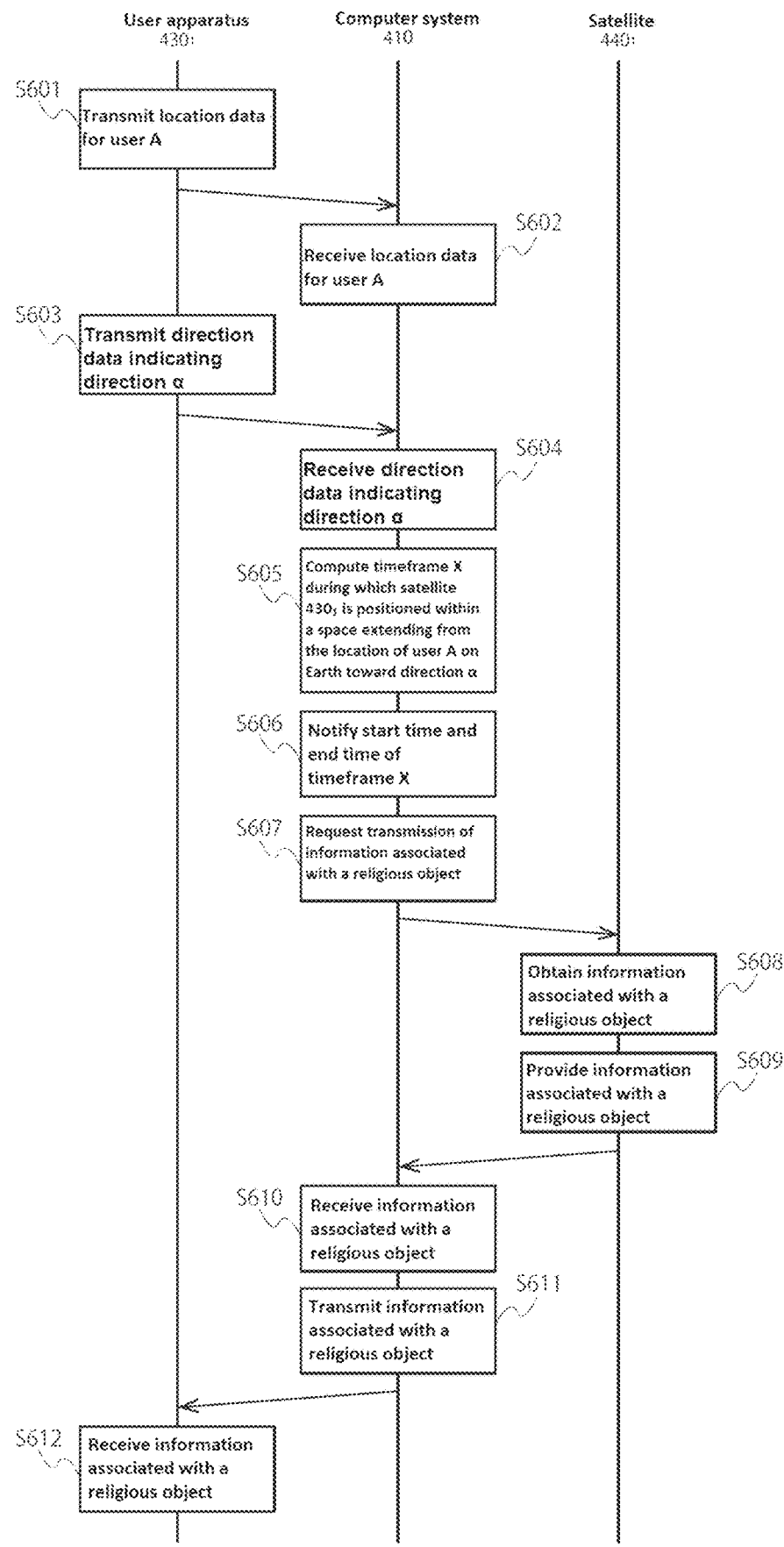
FIG. 6 is a diagram showing an example of the flow of processing executed in computer system 410, user apparatus 430₁, and satellite 440₁.
Figure 8A:
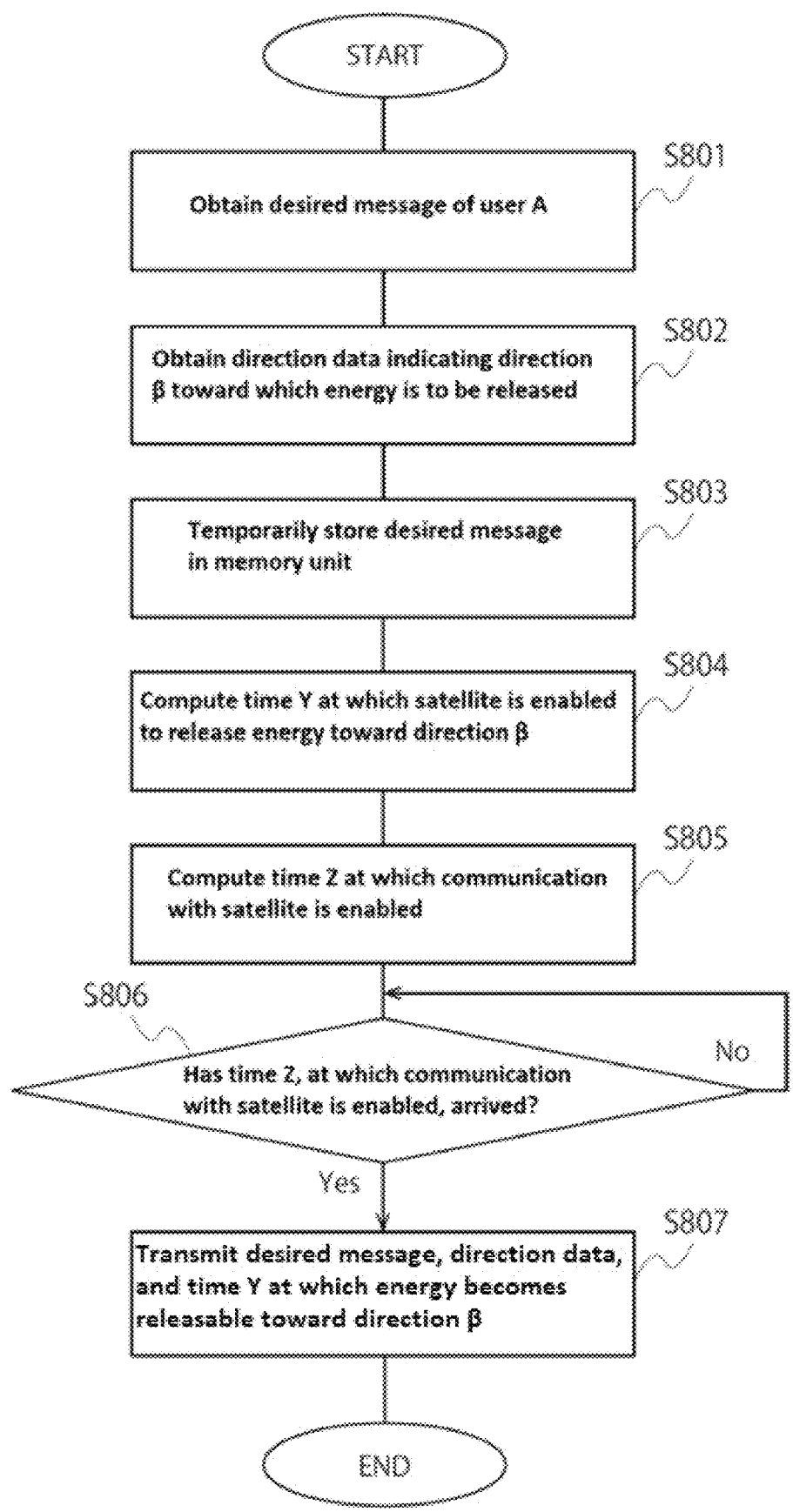
FIG. 8A is a diagram showing an example of the flow of processing executed in computer system 410.

A program required for executing processing, data required for executing the program, etc. are stored in the memory unit 413. For example, a program for executing the processing shown in FIGS. 6, 7, and 8A is stored in the memory unit 413. In this regard, the program can be stored in the memory unit 413 in any manner. For example, a program may be preinstalled in the memory unit 413. Alternatively, a program may be installed in the memory unit 413 by downloading the program via a network such as the Internet 420, or may be installed in the memory unit 413 via a storage medium such as an optical disk or USB.

The processing unit 412 controls the entire operation of the computer system 410. The processing unit 412 reads out a program stored in the memory unit 413 and executes the program. This enables the computer system 410 to function as an apparatus that executes a desired step.

The computer system 410 is connected to a database unit 450. In the example shown in FIG. 4, the database unit 450 comprises a user database unit 451, a deceased individual database unit 452, and a satellite database unit 453.

Each of the at least one user apparatus $430_1$ to $430_N$ is configured to be able to communicate with the computer system 410 via the Internet 420. For example, each of the at least one user apparatus $430_1$ to $430_N$ may be a mobile wireless terminal such as a mobile phone, smartphone, tablet, smartglasses, or smartwatch, or a personal computer such as a desktop PC or laptop PC.

In the embodiment shown in FIG. 4, the satellite $440_1$ comprises an interface unit 441, a processing unit 442 comprising one or more CPUs (Central Processing Units), a memory unit 443, and information providing means 444 for providing information associated with a religious object.

The information providing means 444 is, for example, one or both of a first camera capable of capturing the scenery of Earth seen from a religious object and a second camera capable of capturing the religious object of the satellite 110, or a single camera capable of capturing 360 degrees around to capture both the scenery of Earth seen from the religious object and the religious object, but said means is not limited thereto. In this regard, capturing of the religious object includes capturing the religious object and the background thereof in addition to capturing only the religious object.

The satellite $440_1$ may further comprise a propulsion mechanism for increasing or decreasing the orbiting speed of the satellite $440_1$ (not shown), a propulsion mechanism for maintaining the orbit around Earth on an orbit (not shown), and/or a posture controlling mechanism for controlling the orientation or posture of the satellite $440_1$ (not shown) (e.g., thruster, magnetorquer, or gyro).

The embodiment shown in FIG. 4 describes an example wherein the satellite $440_1$ communicates with the computer system 410 via the ground station G, but the present invention is not limited thereto. The communication between the computer system 410 and each of the at least one satellite $440_1$ to $440_M$ may be materialized by direct connection without being relayed, or materialized via any ground station (relay station) on Earth, which is capable of relaying satellite communication with ground communication. The communication between the computer system 410 and each of the at least one satellite $440_1$ to $440_M$ may also be materialized via any ground station (relay station) on Earth, which is capable of relaying ground communication with ground communication in addition to any ground station (relay station) on Earth, which is capable of relaying satellite communication with ground communication. The number of ground stations (relay stations) relaying such communication is any integer that is one or greater.

Since the configuration of the interface unit 441, processing unit 442, and memory unit 443 of the satellite $440_1$ is the same as the configuration of the interface unit 411, processing unit 412, and memory unit 413 of the computer system 410, a detailed description thereof is omitted herein. Since the configuration of each of the satellites $440_2$ to $440_M$ is the same as the configuration of the satellite $440_1$, a detailed description thereof is omitted herein.

The orbits around Earth of each of the satellites $440_1$ to $440_M$ may all be the same, or at least some may be different, or all may be different from one another.

The example shown in FIG. 4 describes that the at least one user apparatus $430_1$ to $430_N$ can communicate with the computer system 410 via the Internet 420, but the present invention is not limited thereto. Any type of network can be used instead of the Internet 420. A configuration that electrically couples the at least one user apparatus $430_1$ to $430_N$ with the computer system 410 without going through the Internet 420 or any network that is a substitute thereof is also within the scope of the invention. Furthermore, a system integrally incorporated with both the function of the user apparatus $430_1$ and the function of the computer system 410 (i.e., standalone system) may be constructed as the computer system 410. Such a standalone computer system 410 is also within the scope of the invention.

In the example shown in FIG. 4, the database unit 450 is provided external to the computer system 410, but the present invention is not limited thereto. The database unit 450 can also be provided inside the computer system 410. The configuration of the database unit 450 is not limited to a specific hardware configuration. For example, the database unit 450 may be comprised of a single hardware part or a plurality of hardware parts. For example, the database unit 450 may be configured as a single external hard disk drive of the computer system 410, or as storage on the cloud connected via a network. The configuration of each database unit contained in the database unit 450 is also not limited to a specific hardware configuration. For example, each database unit contained in the database unit 450 may also be comprised of a single hardware part or a plurality of hardware parts.

Figure 5A:
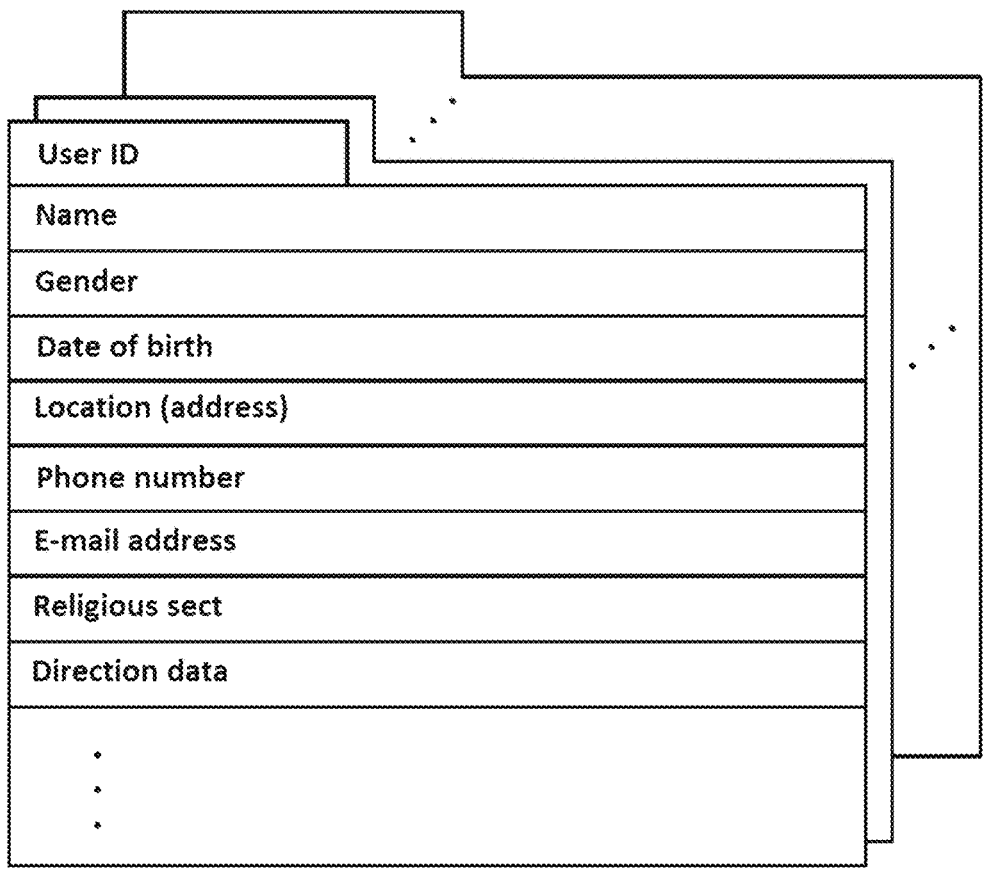
FIG. 5A is a diagram showing an example of the configuration of information stored in user database unit 451.

FIG. 5A shows an example of the configuration of information stored in the user database unit 451.

Information related to a user is stored in the user database unit 451. Information related to a user can be identified by, for example, information for identifying the user (user ID). In the example shown in FIG. 5A, the user's name, gender, data of birth, location (address), phone number, E-mail address, religious sect, etc. are also stored in the user database unit 451. If the direction is determined by default (e.g., in accordance with the religious sect), direction data indicating the direction determined by default may be further stored in the user database unit 451.

To receive a service under the business model described in reference to FIGS. 1 to 3, a user may need to register as a member in advance. User information inputted during member registration can be stored within the user database unit 451.

Figure 5B:
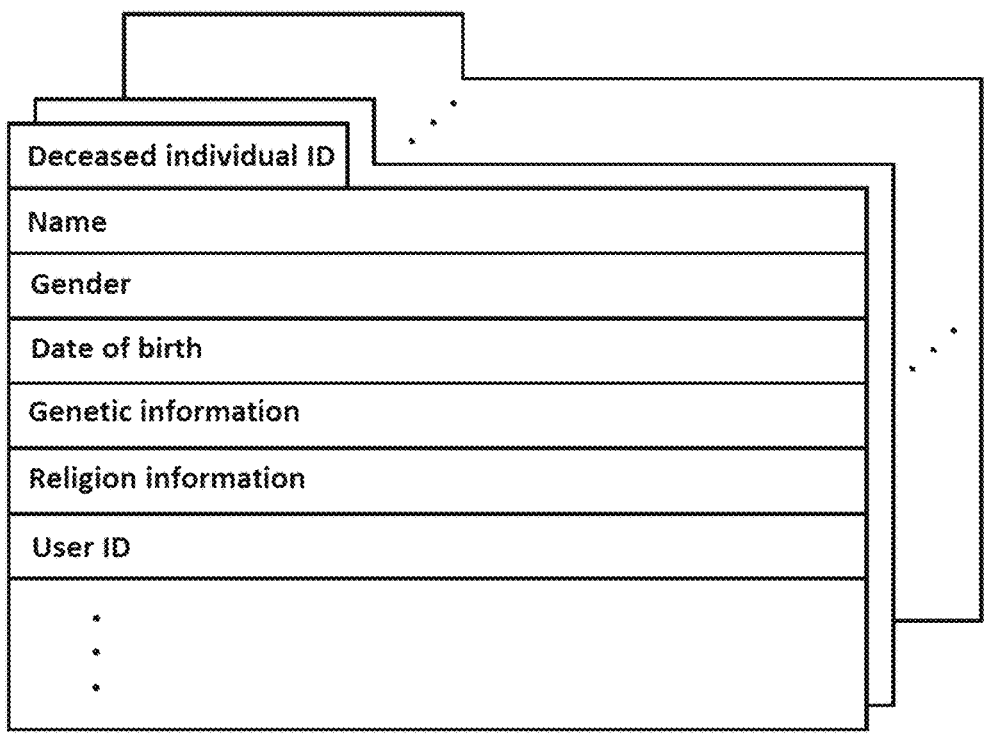
FIG. 5B is a diagram showing an example of the configuration of information stored in deceased individual database unit 452.

FIG. 5B shows an example of the configuration of information stored in the deceased individual database unit 452.

Information related to a deceased individual is stored in the deceased individual database unit 452. Remains from cremation such as bones and/or ash of the deceased individual is stored within a storage unit (especially one or more housings) of one of more of the at least one satellite $440_1$ to $440_M$. Information related to a deceased individual can be identified by information for identifying the deceased individual (e.g., deceased individual ID). Information related to a deceased individual is associated with information for identifying a user (e.g., user ID for identifying a user who is a relative of the deceased individual). The deceased individual's name, gender, date of birth, genetic information, religious information (e.g., religious sect or Dharma name), etc., may be further stored in the deceased individual database unit 452.

Figure 5C:
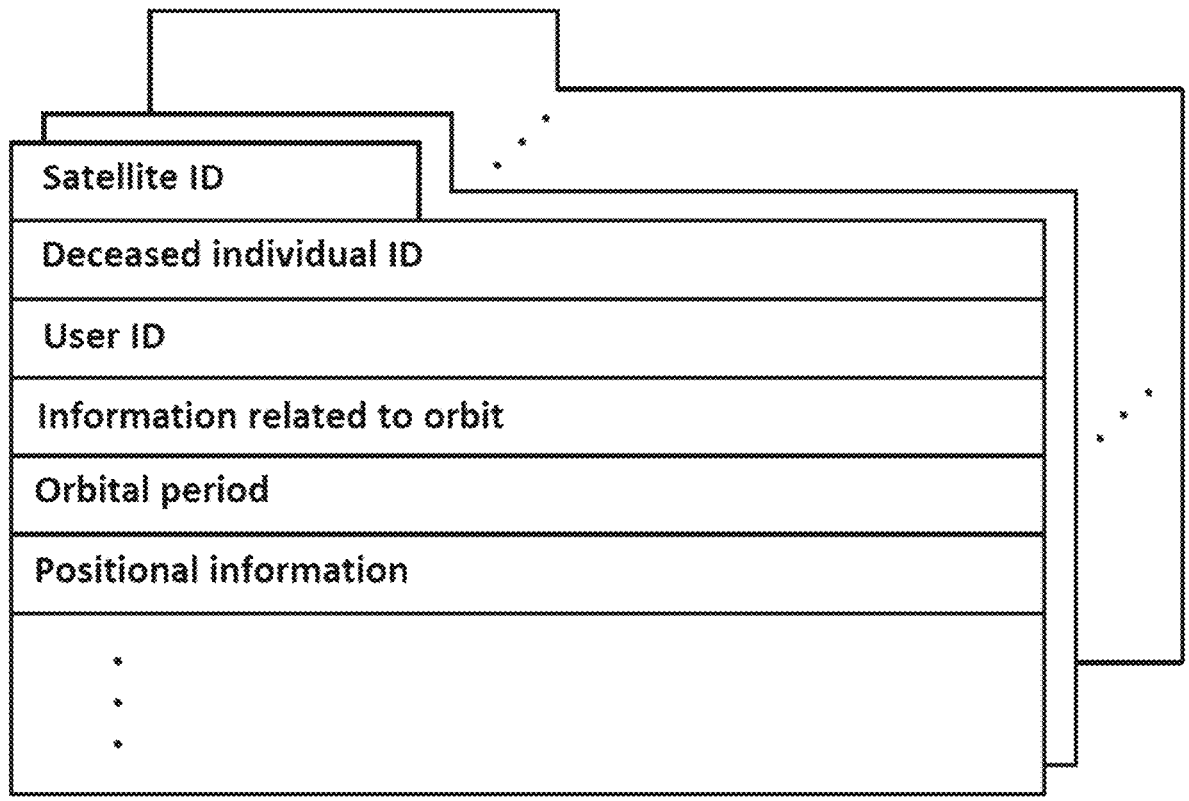
FIG. 5C is a diagram showing an example of the configuration of information stored in satellite database unit 453.

FIG. 5C shows an example of the configuration of information stored in the satellite database unit 453.

Information related to a satellite is stored in the satellite database unit 453. Information related to a satellite can be identified by information for identifying a satellite (e.g., satellite ID). Information for identifying a satellite is associated with information for identifying a deceased individual (deceased individual ID) whose remains from cremation such as bones and/or ash is stored within a storage unit of a satellite identified by the information for identifying a satellite, as well as a user ID associated with the associated deceased individual ID. The satellite database unit 453 further stores information related to the orbit, orbital period, and positional information of a satellite.

Information within the database unit 450 may also be stored in a memory unit of each of the at least one satellite $440_1$ to $440_M$, whereby each of the at least one satellite $440_1$ to $440_M$ can obtain the same information as information within the database unit 450 from the memory unit as needed.

5. Processing of Computer System

FIG. 6 shows an example of the flow of processing executed in the computer system 410, user apparatus $430_1$, and satellite $440_1$. The flow of processing shown in FIG. 6 is for presenting information associated with a religious object of the satellite $440_1$ to user A. Among the plurality of steps shown in FIG. 6, steps S601, S603, and S612 are executed by, for example, a processing unit of the user apparatus $430_1$, steps S602, S604 to S607, and S610 to S611 are executed by, for example, the processing unit 412 of the computer system 410, and steps S608 to S609 are executed by the processing unit 442 of the satellite $440_1$. In the embodiment shown in FIG. 6, it is assumed that the user apparatus $430_1$ is used by user A. It is also assumed that a religious object to which user A prays is enshrined in the satellite $440_1$. Each step shown in FIG. 6 is described hereinafter.

Step S601: The user apparatus $430_1$ transmits location data indicating the location of user A on Earth to the computer system 410. Location data on user A may be, for example, data indicating a location on Earth inputted by user A on the user apparatus $430_1$, or data for positional information of the user apparatus $430_1$ on Earth which can be obtained by the user apparatus $430_1$ with its GPS function.

Step S602: The computer system 410 receives location data indicating the location of user A on Earth from the user apparatus $430_1$.

Step S603: The user apparatus $430_1$ transmits direction data indicating direction α to the computer system 410. Direction α is a direction toward which user A prays to a religious object enshrined in the satellite $440_1$. Direction data indicating direction α may be, for example, desired direction of user A inputted by user A on the user apparatus $430_1$, a predetermined direction stored in advance in a memory unit of the user apparatus $430_1$, a direction designated at random (e.g., by the computer system 410), or a direction designated in the past (e.g., direction designated in previous instance).

Step S604: The computer system 410 receives direction data indicating direction α from the user apparatus $430_1$.

The embodiment shown in FIG. 6 describes an example wherein the computer system 410 receives location data for user A from the user apparatus $430_1$, but the present invention is not limited thereto. For example, the computer system 410 may receive a user ID of user A from the user apparatus $430_1$ and reference the user database unit 451 based on the received user ID to obtain data indicating the address of user A stored in the user database unit 451 as location data for user A.

The embodiment shown in FIG. 6 describes an example wherein the computer system 410 receives direction data from the user apparatus $430_1$, but the present invention is not limited thereto. For example, if the direction toward which user A prays is predetermined, the computer system 410 may receive a user ID of user A from the user apparatus $430_1$, and reference the user database unit 451 based on the received user ID to obtain direction data for user A stored in the user database unit 451.

Step S605: The computer system 410 computes timeframe X during which the satellite $440_1$ is positioned within a space extending from a location of user A on Earth toward direction α. This step is executed based at least on location data for user A and direction data indicating direction α. This step can be executed based further on orbit and positional information of the satellite $440_1$.

In this regard, the space extending from a location of user A on Earth toward direction α refers to a substantially conical space with the location of user A on Earth as the vertex, and direction α within the range of ±degrees (i.e., substantially conical shape having a longitudinal axis along direction α at a vertex angle of 10 degrees).

For example, if there are a plurality of satellites, the computer system 410 may receive a satellite ID for identifying the satellite $440_1$ from the user apparatus $430_1$ and reference the satellite database unit 453 based on the received satellite ID to identify the satellite $440_1$. Alternatively, the computer system 410 may receive a user ID for identifying user A from the user apparatus $430_1$, reference the satellite database unit 453 to identify a satellite ID associated with the received user ID, and identify the satellite $440_1$ based on the identified satellite ID.

Step S606: The computer system 410 notifies the start time and end time of timeframe X to user A. This step is achieved, for example, by transmitting the start time and end time of timeframe X to the user apparatus $430_1$, whereby the screen 210 shown in FIG. 2A can be displayed on the user apparatus $430_1$ so that user A can be aware of timeframe X and recognize that the start time of timeframe X is approaching. This step is executed at a timing where the current time is before the start time of timeframe X.

Step S607: When nearing the start time of timeframe X, the computer system 410 requests the satellite 440$_1$ to transmit information associated with a religious object in the satellite 440$_1$.

Step S608: The satellite 440$_1$ obtains information associated with a religious object in response to receiving a request to transmit information associated with a religious object from the computer system 410. This processing is achieved by, for example, the information providing means 444 of the satellite 440$_1$. Obtaining information associated with a religious object comprises, for example, capturing the scenery of Earth seen from the religious object of the satellite 440$_1$ by a first camera of the satellite 440$_1$ and capturing the religious object of the satellite 440$_1$ by a second camera of the satellite 440$_1$. Alternatively, obtaining information associated with a religious object comprises, for example, capturing both the scenery of Earth seen from the religious object and the religious object by a single camera capable of capturing 360 degrees of the satellite 440$_1$.

Step S609: The information providing means 444 of the satellite 440$_1$ provides the information associated with a religious object obtained in step S608 to the computer system 410.

Step S610: The computer system 410 receives information associated with a religious object from the satellite 440$_1$.

Upon arrival of the start time of timeframe X, the computer system 410 may notify user A of the start of timeframe X. This is achieved, for example, by the computer system 410 notifying the start of timeframe X to the user apparatus 430$_1$.

Step S611: Upon arrival of the start time of timeframe X, the computer system 410 transmits information associated with a religious object to the user apparatus 430$_1$ only during timeframe X.

Step S612: The user apparatus 430$_1$ receives information associated with a religious object from the computer system 410 only during timeframe X, whereby the screen 220 shown in FIG. 2B is displayed on the user apparatus 430$_1$ so that user A can feel as though they are being watched over by a religious object of the satellite 440$_1$ from space.

As a result of the information providing means 444 of the satellite 440$_1$ transmitting information associated with a religious object to the computer system 410 "only during timeframe X", the computer system 410 may transmit the information associated with a religious object to the user apparatus 430$_1$ "only during timeframe X". Alternatively, the information providing means 444 of the satellite 440$_1$ may always transmit information associated with a religious object to the computer system 410, while the computer system 410 may transmit information associated with the religious object to the user apparatus 430$_1$ "only during timeframe X". Alternatively, the information providing means 444 of the satellite 440$_1$ may always transmit information associated with a religious object and the computer system 410 may always transmit information associated with the religious object to the user apparatus 430$_1$ in response to receiving information associated with the religious object, while the user apparatus 430$_1$ may receive information associated with the religious object "only during timeframe X".

The embodiment shown in FIG. 6 describes an example of executing steps S603 and S604 after steps S601 and S602, but the present invention is not limited thereto. Steps S603 and S604 may be executed at any timing before step S605 is executed.

Steps S601 to S604 shown in FIG. 6 do not need to be executed every time in order to present information associated with a religious object in the satellite 440$_1$ to user A. For example, steps S601 to S604 shown in FIG. 6 may be executed in advance, and location data for user A and direction data may be stored in the database unit 450 of the computer system 410 and/or the memory unit 443 of the satellite 440$_1$ before step S605 is executed. In such a case, step S605 shown in FIG. 6 may be executed, for example, in response to receiving a user ID of user A from the user apparatus 430$_1$.

FIG. 7 shows another example of the flow of processing executed in the computer system 410, user apparatus 430$_1$, and satellite 440$_1$. The flow of processing shown in FIG. 7 is for providing an offering to one of the one or more housings of the satellite 440$_1$. Among the plurality of steps shown in FIG. 7, step S701 is executed by, for example, a processing unit of the user apparatus 430$_1$, steps S702 to S704 are executed by the processing unit 412 of the computer system 410, and steps S705 to S706 are executed by the processing unit 442 of the satellite 440$_1$. In the embodiment shown in FIG. 7, it is assumed that the user apparatus 430$_1$ is used by user A. It is also assumed that remains from cremation such as bones and/or ash of deceased individual C who is a relative of user A is stored in housing B, which is one of the one or more housings of the satellite 440$_1$. Each step shown in FIG. 7 is described hereinafter.

Step S701: The user apparatus 430$_1$ transmits a deceased individual ID for identifying deceased individual C who is a relative of user A and desired data of user A to the computer system 410. Examples of desired data include, but are not limited to, text data, image data, audio data, and a combination thereof. Image data is still image data and/or video data.

Step S701 is executed at any timing. For example, step S701 can be executed immediately after step S612 of FIG. 6.

Step S702: The computer system 410 receives a deceased individual ID for identifying deceased individual C and desired data of user A from the user apparatus 430$_1$.

Step S703: The computer system 410 references the satellite database unit 453 based on a deceased individual ID for identifying deceased individual C to identify a satellite ID of the satellite 440$_1$ having housing B, in which the remains from cremation such as bones and/or ash of deceased individual C is stored, whereby the satellite 440$_1$ is identified as a destination of transmission of desired data of user A.

Step S704: The computer system 410 transmits desired data of user A to the satellite 440$_1$ as an offering based on the satellite ID identified in step S703.

Step S705: The satellite 440$_1$ receives desired data of user A from the computer system 410.

Step S706: The satellite 440$_1$ stores the received desired data of user A in a memory unit of housing B. As a result, the desired data of user A is transmitted to housing B from the computer system 410 as an offering, so that user A can give an offering with data such as a desired message or image from anywhere on Earth to appease the soul of deceased individual C.

The computer system 410 may be configured so that points can be awarded to user A in accordance with the number of times the image 220 in FIG. 2B is displayed on the user apparatus 430$_1$, the number of times user A is deemed to have viewed the screen 220 by pressing or tapping a view button that can be displayed on the screen 220 of FIG. 2B, the number of times user A has provided an offering in step S701 of FIG. 7, etc. in step S612 of FIG. 6, whereby user A can receive a special gift (e.g., talisman, goods, shrine stamp, or image of shrine stamp) if points awarded exceed a threshold value. The threshold value of points awarded may be stored, for example, in the database unit 450.

FIG. 8A shows an example of the flow of processing executed in the computer system 410. The flow of processing shown in FIG. 8A is for releasing energy, having a desired message of a user placed therein, toward a desired direction of the user. Each step shown in FIG. 8A is executed by, for example, the processing unit 412 of the computer system 410. In the embodiment shown in FIG. 8A, it is assumed that the user apparatus $430_1$ is used by user A. It is also assumed that the satellite $440_1$ is configured to be able to release energy. Examples of releasing energy include, but are not limited to, releasing an electromagnetic wave (e.g., light, radio wave, or laser) and ejecting an object. Each step shown in FIG. 8A is described hereinafter.

Step S801: A desired message of user A is obtained. This processing is achieved by, for example, receiving a desired message of user A from the user apparatus $430_1$. A desired message of user A is, for example, a message inputted into the user apparatus $430_1$ by user A.

Step S802: Direction data indicating direction β toward which energy is to be released is obtained. This processing may be achieved by, for example, receiving direction data indicating direction β from the user apparatus $430_1$, or by reading out direction data indicating direction β from the user database unit 451 of the computer system 410, based on a user ID of user A received from the user apparatus $430_1$. Examples of the direction data indicating direction β include, but are not limited to, data indicating a celestial body (e.g., data indicating a star (e.g., fixed start, planet, or satellite), data indicating a constellation, and data indicating a nebula). Direction data may be converted to an astronomical coordinate system (e.g., equatorial coordinate system, ecliptic coordinate system, galactic coordinate system, or supergalactic coordinate system) by the computer system 410, but is preferably converted to an equatorial coordinate system.

If there are a plurality of satellites, the computer system 410 may, for example, receive a satellite ID for identifying the satellite $440_1$ from the user apparatus $430_1$, and reference the satellite database unit 453 based on the received satellite ID to identify the satellite $440_1$. Alternatively, the computer system 410 may receive a user ID for identifying user A from the user apparatus $430_1$, reference the satellite database unit 453 to identify a satellite ID associated with the received user ID, and identify the satellite $440_1$ based on the identified satellite ID. Alternatively, the computer system 410 may reference the satellite database unit 453 and identify a satellite capable of releasing energy at the earliest moment toward direction β (e.g., satellite currently located at a location where energy can be released toward direction β or satellite that would arrive at a location where energy can be released toward direction β at the earliest moment) based on at least one of information related to an orbit, orbital period, and positional information stored in the satellite database unit 453, whereby the satellite $440_1$ is identified.

Step S803: A desired message of user A is temporarily stored in the memory unit 412 of the computer system 410. A desired message of user A is read out from the memory unit 412 of the computer system 410 for transmission to the satellite $440_1$, before executing step S807.

Step S804: Time Y at which the satellite $440_1$ is enabled to release energy toward direction β is computed. This processing is executed, for example, by referencing the satellite database unit 453 based on the orbit and positional information of the satellite $440_1$. If energy is targeted for release toward a planet or asteroid within the solar system, time Y needs to be computed by further considering the orbit of the planet or asteroid. Such computation is performed based further on, for example, the orbit, orbital period, or positional information of a star that can be stored in the database unit 450. Time Y may be, for example, "XX:OO Japan Standard Time", "OO:ΔΔ Greenwich Mean Time", or "XX hours and □□ minutes from current time". For example, a timeframe during which proceeding straight from the satellite $440_1$ toward direction β does not result in contact (collision) with Earth and/or Sun and/or Moon is a timeframe during which the satellite $440_1$ can release energy toward direction β.

Step S805: Time Z, at which communication with the satellite $440_1$ is enabled, is computed. This processing is executed, for example, by referencing the satellite database unit 453, based on the orbit and positional information of the satellite $440_1$ and positional information of the computer system 410. Time Z may be, for example, "OO:XX Japan Standard Time", "ΔΔ:OO Greenwich Mean Time", or "□□ hours and XX minutes from current time". Positional information of the computer system 410 may be stored, for example, within the database unit 450. Time Z is located before time Y on the temporal axis.

Step S806: It is determined whether time Z, at which communication with the satellite $440_1$ is enabled, has arrived. If the determination result is "Yes", processing proceeds to step S807. If the determination result is "No", processing returns to step S806.

Step S807: The desired message of user A obtained in step S801, the direction data obtained in step S802, and time Y at which the satellite $440_1$ is enabled to release energy toward direction β are transmitted to the satellite $440_1$, whereby, upon arriving of time Y at which the satellite $440_1$ is enabled to release energy toward direction β, the satellite $440_1$ reaches a state in which energy in accordance with the desired message of user A can be released. Examples of releasing energy in accordance with a desired message of user A include, but are not limited to, releasing energy with varied release intervals in accordance with a desired message of user A (e.g., energy release in a form of Morse code).

The computer system 410 may further transmit an instruction to release energy in accordance with a desired message of user A toward direction β to the satellite $440_1$ in step S807 so that the satellite $440_1$ releases energy in accordance with the desired message of user A toward direction β in accordance with the instruction. Alternatively, the satellite $440_1$ may be configured to automatically release energy in accordance with a desired message of user A toward direction β upon arrival of time Y in response to receiving the combination of the desired message of user A, direction data, and time Y at which the satellite $440_1$ is enabled to release energy toward direction β.

After step S807, the computer system 410 may be configured to transmit a notification notifying that energy in accordance with a desired message of user A has been released by satellite $440_1$ to the user apparatus $430_1$, whereby user A can find out that the release of energy in accordance with a desired message of user A has been completed.

The embodiment shown in FIG. 8A describes an example of executing step S803 after step S802, but the present invention is not limited thereto. Step S803 can be executed at any timing after step S801 and before step S807. The embodiment shown in FIG. 8 describes an example of executing steps S804 and S805 after step S803, but the present invention is not limited thereto. Steps S804 and S805 can be executed at any timing after step S802 and before step S806.

The embodiment shown in FIG. 8A describes an example wherein the computer system 410 receives both a desired message of user A and direction data from the user apparatus $430_1$, but the present invention is not limited thereto. The computer system 410 may obtain a desired message of user A by a method such as receiving a message from the user apparatus $430_1$, while obtaining direction data by a method other than a method such as receiving data from the user apparatus $430_1$. For example, when a desired message of user A comprises a flag indicating the type of direction data and the corresponding relationship between the direction toward which energy is to be released and the flag indicating the type of direction data is stored in the database unit 450, the computer system 410 may be configured to obtain the desired message of user A in step S801, then identify the flag indicating the type of direction data contained in the obtained desired message, and reference the database unit 450 based on the identified flag to identify a direction toward which energy is to be released.

Figure 8B:
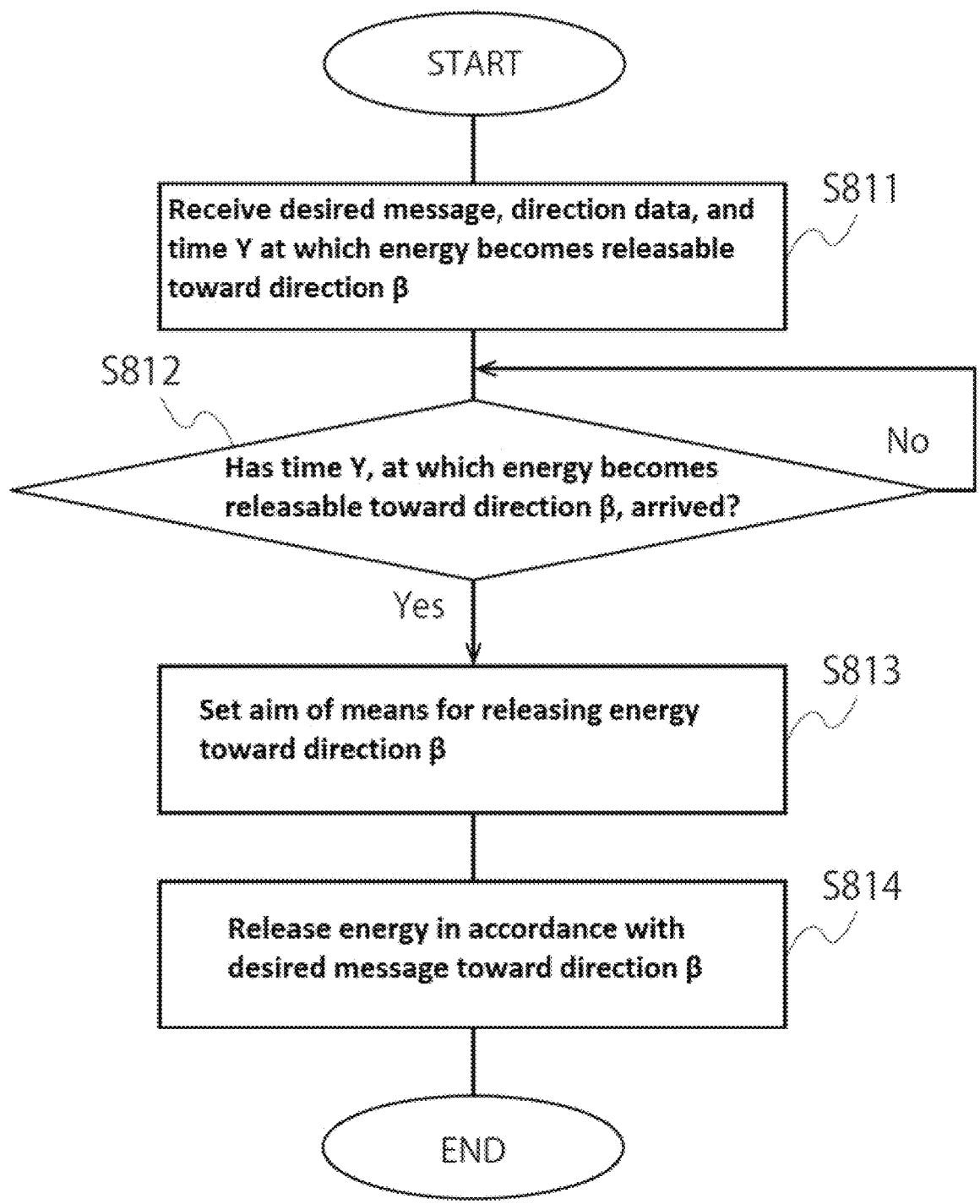
FIG. 8B is a diagram showing an example of the flow of processing executed in satellite 440₁.

FIG. 8B shows an example of the flow of processing executed in the satellite $440_1$. The flow of processing shown in FIG. 8B is for releasing energy, having a desired message of a user placed therein, toward a desired direction of the user. Each step shown in FIG. 8B is executed by, for example, the processing unit 442 of the satellite $440_1$. In the embodiment shown in FIG. 8B, it is assumed that the satellite $440_1$ is configured so that energy can be released toward a desired direction (comprises means for releasing energy toward a desired direction). Examples of releasing energy include, but are not limited to, releasing an electromagnetic wave (e.g., light, radio wave, or laser) and ejecting an object. Each step shown in FIG. 8B is described hereinafter.

Step S811: A desired message of user A, direction data indicating direction β toward which energy is to be released, and time Y at which the satellite $440_1$ is enabled to release energy toward direction β are received. This processing is achieved, for example, by receiving the desired message of user A, direction data, and time Y from the computer system 410. Direction data may be converted to an astronomical coordinate system (e.g., equatorial coordinate system, ecliptic coordinate system, galactic coordinate system, or supergalactic coordinate system) by the satellite $440_1$, but is preferably converted to an equatorial coordinate system.

Step S812: It is determined whether time Y, at which the satellite $440_1$ is enabled to release energy toward direction β, has arrived. If the determination result is "Yes", processing proceeds to step S813. If the determination result is "No", processing returns to step S812.

Step S813: Aim is set in direction β so that the satellite $440_1$ can release energy toward direction β. This processing may be achieved, for example, by automatically changing the orientation of the means for releasing energy by the means for releasing energy to orient the aim of the means for releasing energy toward direction β, or by automatically changing the orientation of the satellite $440_1$ by the satellite $440_1$ by using a posture controlling mechanism for controlling the orientation/posture of the satellite $440_1$ to orient the aim of the means for releasing energy toward direction β.

Step S814: Energy in accordance with a desired message of user A is released toward direction β. This processing is executed by, for example, means for releasing energy, and the satellite $440_1$ comprises means for releasing energy toward a desired direction.

The embodiments shown in FIGS. 8A and 8B describe examples wherein the computer system 410 computes time Y, but the present invention is not limited thereto. For example, the satellite $440_1$ may compute time Y. More specifically, the embodiments may be configured so that:

(1) the computer system 410 obtains a desired message of user A;

(2) the computer system 410 obtains direction data indicating direction β toward which energy is to be released;

(3) the computer system 410 computes time Z, at which communication with the satellite $440_1$ is enabled (based on, for example, orbit and positional information of the satellite $440_1$, and positional information of the computer system 410);

(4) the computer system 410 determines whether time Z, at which communication with the satellite $440_1$ is enabled, has arrived;

(5) if it is determined that time Z, at which communication with the satellite $440_1$ is enabled, has arrived, the computer system 410 transmits the desired message of user A and the direction data indicating direction β toward which energy is to be released to the satellite $440_1$;

(6) the satellite $440_1$ computes time Y at which the satellite $440_1$ is enabled to release energy toward direction β (based on, for example, orbit and positional information of the satellite $440_1$);

(7) the satellite $440_1$ determines whether time Y at which the satellite $440_1$ is enabled to release energy toward direction β has arrived; and (8) if it is determined that time Y at which the satellite $440_1$ is enabled to release energy toward direction β has arrived, the satellite $440_1$ releases energy toward direction β.

As disclosed above, the present invention is exemplified by the use of its preferred embodiments. However, the present invention should not be interpreted to be limited to such embodiments. It is understood that the scope of the present invention should be interpreted based solely on the claims. It is understood that an equivalent scope can be practiced by those skilled in the art based on the descriptions of the present invention and common general knowledge from the specific descriptions in the preferred embodiments of the invention.

INDUSTRIAL APPLICABILITY

The present invention is useful as an invention that provides a computer system that enables materialization of the concept of "space temple", a method and a program that is executed in the computer system, etc.

REFERENCE SIGNS LIST

410 Computer system
420 Internet
$430_1$ to $430_N$ User apparatus
$440_1$ to $440_M$ Satellite
450 Database unit

The invention claimed is:

1. A computer system for providing a service to a plurality of users by utilizing a satellite on an orbit around Earth, wherein the satellite is configured to be able to release energy,
the computer system comprises a processing unit,
the computer system is configured so that communication can be established with the satellite,
the processing unit is configured to execute at least:
obtaining a desired message of a first user, the first user being one of the plurality of users;
obtaining direction data for designating a direction toward which energy is to be released, the direction data is data indicating a celestial body other than Earth, data indicating a constellation, or data indicating a nebula; and
transmitting the desired message and the direction data to the satellite,
wherein the satellite is configured to release energy with varied emission intervals in accordance with the desired message toward a direction designated by the direction data.

2. The computer system of claim 1, wherein the processing unit is configured to further execute:
computing a first time at which the satellite is enabled to release the energy toward the direction; and
transmitting the first time to the satellite, and
the desired message and the direction data are used by the satellite upon arrival of the first time.

3. The computer system of claim 1, wherein the processing unit is configured to further execute:
computing a second time at which communication with the satellite is enabled; and
determining whether the second time has arrived, and the transmitting the desired message and the direction data is executed when it is determined that the second time has arrived.

4. A method executed in a computer system for providing a service to a plurality of users by utilizing a satellite on an orbit around Earth, wherein
the satellite is configured to be able to release energy,
the computer system comprises a processing unit,
the computer system is configured so that communication can be established with the satellite,
the method comprises:
obtaining, by the processing unit, a desired message of a first user, the first user being one of the plurality of users;
obtaining, by the processing unit, direction data for designating a direction toward which energy is to be released, the direction data is data indicating a celestial body other than Earth, data indicating a constellation, or data indicating a nebula; and
transmitting, by the processing unit, the desired message and the direction data to the satellite, wherein the satellite is configured to release energy with varied emission intervals in accordance with the desired message toward a direction designated by the direction data.

5. A non-transitory computer-readable medium storing instructions executed in a computer system comprising a processing unit for providing a service to a plurality of users by utilizing a satellite on an orbit around Earth, wherein the satellite is configured to be able to release energy,
the computer system is configured so that communication can be established with the satellite,
the instructions, when executed by the processing unit, causes the processing unit to execute at least:
obtaining a desired message of a first user, the first user being one of the plurality of users;
obtaining direction data for designating a direction toward which energy is to be released, the direction data is data indicating a celestial body other than Earth, data indicating a constellation, or data indicating a nebula; and
transmitting the desired message and the direction data to the satellite, wherein the satellite is configured to release energy with varied emission intervals in accordance with the desired message toward a direction designated by the direction data.

* * * * *